United States Patent
Dahlmann (10) Patent No.: US 10,408,922 B2
(45) Date of Patent: Sep. 10, 2019

(54) OPTOELECTRONIC MODULE WITH LOW- AND HIGH-POWER ILLUMINATION MODES

(71) Applicant: ams Sensors Singapore Pte. Ltd., Singapore (SG)

(72) Inventor: Gerald Dahlmann, Zurich (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 406 days.

(21) Appl. No.: 15/172,383

(22) Filed: Jun. 3, 2016

(65) Prior Publication Data
US 2017/0212220 A1 Jul. 27, 2017

Related U.S. Application Data

(60) Provisional application No. 62/191,102, filed on Jul. 10, 2015.

(51) Int. Cl.
*G01S 17/89* (2006.01)
*G01S 7/481* (2006.01)
*H04N 13/239* (2018.01)

(52) U.S. Cl.
CPC ........ *G01S 7/4815* (2013.01); *G01S 7/4816* (2013.01); *G01S 17/89* (2013.01); *H04N 13/239* (2018.05)

(58) Field of Classification Search
CPC ...... G01S 7/4811; G01S 7/481; G01S 7/4815; G01S 7/4813
See application file for complete search history.

(56) References Cited

U.S. PATENT DOCUMENTS

| | | | | |
|---|---|---|---|---|
| 5,793,491 A | * | 8/1998 | Wangler | G01S 7/4802 356/398 |
| 6,441,363 B1 | * | 8/2002 | Cook, Jr. | G01S 7/4802 180/273 |
| 9,179,522 B2 | | 11/2015 | Delnoij | |
| 2003/0090647 A1 | * | 5/2003 | Isogai | G01C 3/22 356/4.01 |
| 2010/0008588 A1 | * | 1/2010 | Feldkhun | G01B 11/2518 382/206 |
| 2011/0299059 A1 | * | 12/2011 | Buettgen | G01S 7/4911 356/5.01 |
| 2012/0081544 A1 | * | 4/2012 | Wee | G01S 17/023 348/140 |
| 2012/0154785 A1 | * | 6/2012 | Gilliland | G01S 7/4813 356/5.01 |
| 2012/0236320 A1 | * | 9/2012 | Steffey | G01B 11/002 356/614 |
| 2013/0242283 A1 | * | 9/2013 | Bailey | G01S 17/89 356/4.01 |
| 2014/0063261 A1 | * | 3/2014 | Betensky | G01C 3/08 348/158 |
| 2017/0370676 A1 | * | 12/2017 | Volfson | G01S 17/08 |
| 2018/0149751 A1 | * | 5/2018 | Geiger | G01S 17/08 |
| 2018/0341009 A1 | * | 11/2018 | Niclass | G01S 7/4817 |

* cited by examiner

*Primary Examiner* — Eric L Bolda
(74) *Attorney, Agent, or Firm* — Fish & Richardson P.C.

(57) ABSTRACT

The present disclosure describes optoelectronic modules with low- and high-power illumination modes for distance measurements and/or multi-dimensional imaging. Various implementations are described that include low- and high-power emitters. In some instances, a low-power mode may be used to monitor a scene where object movement can activate a high-power mode. In such instances, power reduction may be achieved.

15 Claims, 8 Drawing Sheets

OPTOELECTRONIC MODULE WITH LOW- AND HIGH-POWER ILLUMINATION MODES

TECHNICAL FIELD

This disclosure relates to optoelectronic modules having low- and high-power illumination modes for distance measurements and/or multi-dimensional imaging such as 3D imaging and/or depth-mapping.

BACKGROUND

Optoelectronic modules configured to acquire distances of objects in a three-dimensional scene typically employ an illumination source and an imaging assembly. The imaging assembly, including an optical assembly and pixel array, captures scene-induced modifications to light projected by the illumination source. For example, optoelectronic modules utilizing time-of-flight (TOF) technology typically include a modulated illumination/light source, optical assembly, and array of demodulation pixels. The modulated light is incident onto an object or objects in a scene at various distances from the optoelectronic module. The light is reflected from objects in a scene and is focused by an optical assembly onto a pixel array. The reflected light undergoes a phase shift; the phase shift is detected by pixels in the pixel array, wherein signals are generated that are then correlated to distances in the scene.

Typically, the modulated light source employed in the optoelectronic modules described above homogeneously illuminate a scene within a given field of view which is a particular advantage for high-resolution pixel arrays where the homogeneous illumination may enable the acquisition of high-resolution distance data. Homogenous illumination, however, consumes much power. Further, the aforementioned optoelectronic modules can be used in a number of applications, in particular in mobile applications (i.e., where a mobile, limited power source is required). Accordingly, optoelectronic modules with reduced power consumption are highly desirable.

SUMMARY

This disclosure describes optoelectronic modules having low- and high-power illumination modes for distance measurements and/or multi-dimensional imaging for reduced power consumption.

For example, in one aspect, the disclosure describes an optoelectronic module that includes a substrate (such as a printed circuit board) on which are integrated an imaging assembly, a first illumination assembly, and a second illumination assembly. The imaging assembly includes a pixel array (such as an array of complementary metal-oxide-semiconductor and/or charge-coupled pixels) operable to detect one or more wavelengths of light. The imaging assembly further includes an imaging assembly spacer, and an imaging optical assembly. The pixel array is mounted to the substrate and the imaging assembly spacer is disposed in between the imaging optical assembly and the substrate, where the optical assembly is aligned with the pixel array. The first illumination assembly includes a first emitter (such as a light-emitting diode and/or a vertical-cavity surface-emitting laser) operable to emit a first emitted light of one or more wavelengths (such as light corresponding to the infrared spectrum), a first emitter spacer, and a first optical assembly operable to allow a first emission of the first emitted light to pass. Further the first emitter is mounted to the substrate and the first emitter spacer is disposed in between the first optical assembly and the substrate, and the first optical assembly is aligned with the first emitter. In addition, the second illumination assembly includes a second emitter operable to emit a second emitted light of one or more wavelengths, a second emitter spacer, and a second optical assembly operable to allow a second emission of the second emitted light to pass. Further, the second emitter is mounted to the substrate and the second emitter spacer is disposed in between the second optical assembly and the substrate, and the second optical assembly is aligned with the second emitter.

According to another aspect, the first illumination assembly and the second illumination assembly are arranged to generate first and second respective illuminations with different powers from one another.

According to yet another aspect, the optoelectronic module is operable to determine a distance to an object based on reflections of light from the object detected by the pixel array of the imaging assembly, where a change in position of the object detected by the module activates emission of light by the second emitter.

According to still yet another aspect, a change in position of the object detected by the optoelectronic module causes the first emitter to cease illumination.

Various implementations can provide one or more of the following advantages. For example, some implementations can help reduce power consumed by the optoelectronic module when the module collects distance data via time-of-flight. Still other implementations can help reduce power consumed by the optoelectronic module when the module collects distance data via stereo-imaging.

Other aspects, features and advantages will be readily apparent from the following detailed description, the accompanying drawings and the claims.

DETAILED DESCRIPTION

Figure 1A:
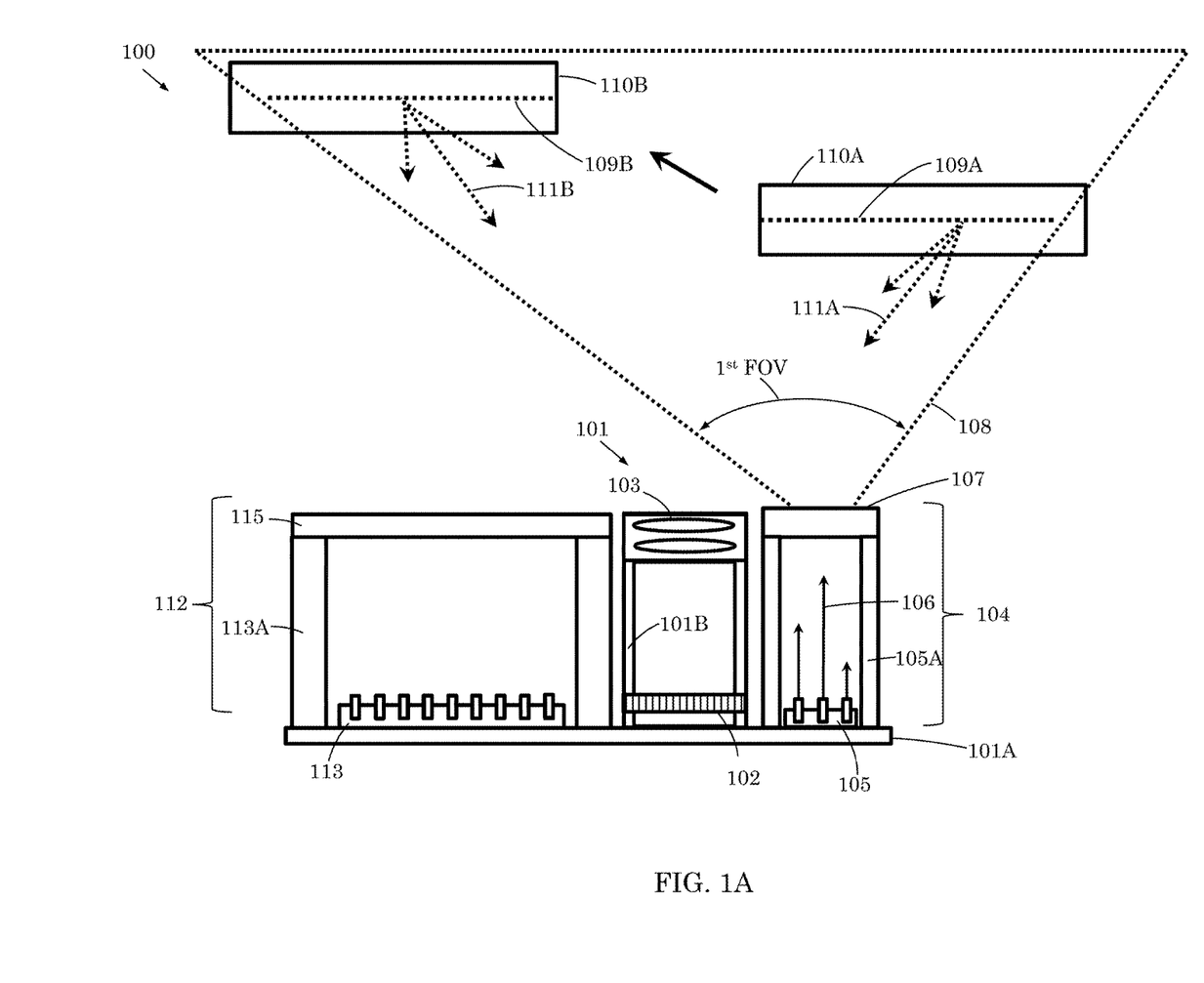
FIG. 1A depicts an example of an optoelectronic module having low- and high-power emitters operating in a low-power mode.

FIG. 1A depicts an example of an optoelectronic module 100 having low- and high-power emitters (which are examples of first and second emitters, respectively) operating in a low-power mode (which is an example of a first mode). The optoelectronic module 100 can include an imaging assembly 101, a substrate 101A (such as a printed circuit board (PCB)), an imaging assembly spacer 101B, a low-power illumination assembly 104 (which is an example of a first illumination assembly), and a high-power illumination assembly 112 (which is an example of a second illumination assembly). The imaging assembly 101 can include a pixel array 102, such as an array of demodulation pixels, mounted on a substrate 101A, and an imaging optical assembly 103. The imaging optical assembly 103 may include a plurality of lens elements, barrels, stops, apertures, and filters. The low-power illumination assembly 104 can include a low-power emitter 105 (which is an example of a first emitter) such as a light emitting diode, edge emitting laser (EEL), vertical-cavity surface-emitting laser (VCSEL), or VCSEL array, mounted on a substrate 101A; a first emitter spacer 105A; and a low-power optical assembly 107 (which is an example of a first optical assembly). In a low-power mode, the low-power emitter 105 emits a low-power emitted light 106 (which is an example of a first emitted light). The low-power emitted light 106 can be any wavelength or range of wavelengths of electromagnetic radiation (e.g. visible or non-visible radiation). For example, low-power emitted light 106 can be near-, mid-, or far-infrared radiation. Further the low-power emitted light 106 can be modulated. The low-power emitted light 106 is incident on the low-power optical assembly 107. The low-power optical assembly 107 can be any one of, or combinations of, the following optical elements: a diffraction grating, a microlens array, a lens, a prism, a micro-prism array, a diffractive optical element or a plurality of any one of the aforementioned or their respective combinations. The low-power optical assembly 107 may further be composed of apertures, spacers, alignment features, and other components pertinent to its function. The low-power emitted light 106 incident on the low-power optical assembly 107 may produce a low-power emission 108 (which is an example of a first emission).

The low-power emission 108 may produce at a first position 110A a low-power illumination 109A (which is an example of a first illumination at a first position) incident on an object at a first position 110A in a scene. The object can be illuminated by the first low-power illumination 109A when at a particular distance or range of distances (e.g., between a few centimeters and several or even tens of meters). The low-power emission 108 may further produce at a second position 110B a low-power illumination 109B (which is an example of a first illumination at a second position) on the object at a second position 110B in the scene. Typically, the TOF module operating in high-power mode may consume tens of mW to tens of W. However, the TOF module in low-power mode may consume considerably less power (e.g., 2 to 100 times less than the high-power mode). The solid arrow in FIG. 1A illustrates movement of the object from the first position 110A to the second position 110B in the scene. The low-power emission 108 may encompass a first field-of-view (FOV). The first low-power illumination 109A and second low-power illumination 109B (which is an example of a first illumination at a second position) may take the form of a pattern of high-contrast features, for example, a discrete array of illuminated dots, lines, or other shapes, or combinations of the aforementioned features. The distance between the high-contrast features can be strongly correlated with the intended application of the optoelectronic module 100; generally, the distance between the features can be on the order of the dimension of the objects in the scene or smaller. For example, if the object is, e.g., a person at a distance of 3 m from the optoelectronic module, the distance between the high-contrast features can be 30-40 cm at the expected working distance. The distance between the high-contrast features could be less, however. For example, if the object is a hand at a distance of 0.5 m from the optoelectronic module, the distance between the high-contrast features can be 5-10 cm. In general, the power required to produce the low-power emission 108, and subsequent low-power illuminations 109A and 109B, is considerably less than the power required to produce a homogenous illumination of the same intensity.

Light reflected from an object at a first position 110A is low-power reflected light 111A (which is an example of a first reflected light at a first position). Light reflected from an object at a second position 110B is low-power reflected light 111B (which is an example of a first reflected light at a second position). The reflected light can be collected and processed by the imaging assembly 101. For example, the first low-power reflected light 111A can be imaged by an optical assembly 103 and focused onto the demodulation pixel array 102, wherein a distant-dependent phase-shift can be determined and correlated with distance from the optoelectronic module 100 to the object at a first position 110A. Similarly, at another instant in time for example, the second low-power reflected light 111B can be correlated with distance to the object at a second position 110B as described above. The detection of a distance or position change between the object at a first position 110A and the object at a second position 110B is associated with object movement. Generally, the aforementioned detection of movement of the object from the first position to the second position may activate a high-power mode (e.g., may activate the high-power illumination assembly 112). However, in other instances, an object entering the scene may also activate a high-power mode.

Figure 1B:
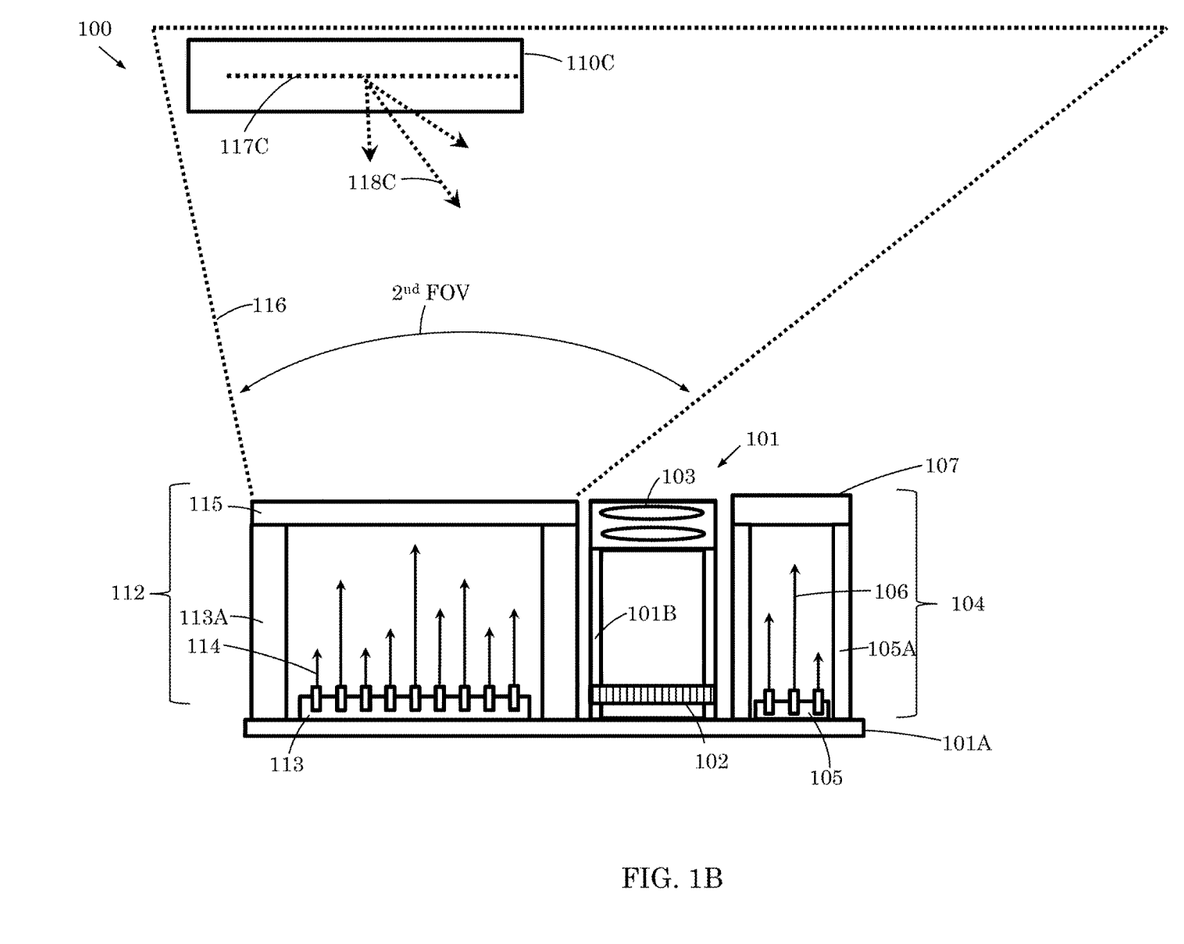
FIG. 1B depicts an example of an optoelectronic module having low- and high-power emitters operating in a high-power mode.

FIG. 1B depicts an example of an optoelectronic module including low- and high-power emitters operating in a high-power mode. The high-power illumination assembly 112 is composed of a high-power emitter 113 (which is an example of a second emitter) mounted on a substrate 101A, a second emitter spacer 113A, and a high-power optical assembly 115 (which is an example of a second optical assembly). In a high-power mode, the high-power emitter 113 emits a high-power emitted light 114 (which is an example of a second emitted light). The high-power emitted light 114 can be any wavelength or range of wavelengths of electromagnetic radiation e.g. visible or non-visible radiation. For example, the high-power emitted light 114 can be near-, mid-, or far-infrared radiation. Further the high-power emitted light 114 can be modulated.

Still further, the high-power emitted light 114 is incident on the high-power optical assembly 115. The high-power optical assembly 115 can be any one of, or combinations of, the following optical elements: a diffraction grating, a microlens array, a lens, a prism, a micro-prism array, a diffractive optical element or a plurality of anyone of the aforementioned or their respective combinations. The high-power optical assembly 115 may further be composed of apertures, spacers, alignment features, and other components pertinent to its function. The high-power emitted light 114 incident on the high-power optical assembly 115 produces a high-power emission 116 (which is an example of a second emission), wherein the high-power emission 116 can be in focus and produce a high-power illumination 117C

(which is an example of a second illumination) on an object or objects 110C in a scene within a particular range of distances (for example, between a few centimeters and several or even tens of meters). The high-power emission 116 may encompass a second FOV. Further the second FOV may substantially encompass and can be substantially equivalent to the first FOV. Both the first and second FOV can be, for example, from about 20° to 140°, although in some instances the FOV may be smaller or greater depending on the intended application.

The high-power illumination 117C can be a homogenous (non-patterned, non-discrete) illumination. In other cases the high-power illumination 117C may take the form of a dense pattern of high-contrast features, for example, a discrete array of illuminated dots, lines, or other shapes, or combinations of the aforementioned features. A high-power reflected light 118C (which is an example of a second reflected light) can be reflected from an object or objects 110C, and collected and processed by the imaging assembly 101. For example, the high-power reflected light 118C can be focused by the imaging optical assembly 103 onto the pixel array 102, wherein a distant-dependent phase-shift can be determined and correlated with distance to an object or objects 110C in the scene. The high-power reflected light 118C, resulting from the high-power illumination 117C, can be focused on a large fraction of the demodulation pixels in the pixel array, whereas the first and second low-power reflected light 111A, 111B, resulting from the first low-power illumination 109A and second low-power illumination 109B, are only focused on a fraction of demodulation pixels in the demodulation pixel array 102. Consequently, higher resolution data can be obtained when the high-power illumination assembly 112 is employed.

The optoelectronic module 100 described above may exhibit considerable reduction in power consumption. For example, the low-power illumination assembly 104 of the optoelectronic module 100 may illuminate an object or objects in a scene until an objected movement is detected; then the high-power illumination assembly 112 can be employed to obtain high-resolution distance data of the object/scene of interest.

Still further, the optoelectronic module 100 described above may exhibit even greater reduction in power consumption when either the low-power emitter 105 and/or the high-power emitter 113 are operated in a pulsed mode. For example, the low-power emitter 105 may illuminate an object or objects in a scene for a short period (e.g., a fraction of a second to 1 second) and my cease to illuminate an object or objects in a scene for another short period (e.g., 1 second to a few seconds). This regime may continue until an object in the scene moves. Upon the detection of movement, as outlined above, the high-power mode (as previously described) can be activated. In other cases, the high-power emitter 113 can be operated in a similar manner. However, the high-power emitter 113 may illuminate and cease to illuminate the scene at considerably shorter periods (e.g., fractions of a second). The duration of the periods of illumination can be highly dependent on the nature of the objects (e.g., their speed of movement, position change).

Although in the above examples object movement was detected by a phase shift in the modulated light reflected by an object in a scene, other variations to the optoelectronic module can be used to detect object movement. For example, the low-power illumination assembly 104 need not illuminate objects in a scene with modulated light. Objects can be illuminated with un-modulated light, wherein the intensity of light reflected from objects in a scene may change and be correlated with movement. Still further, other approaches can be used to detect movement such as via triangulation, i.e., where reflected light focused on a pixel array can be used to determine distance to an object (e.g., using the focal length of the imaging optical assembly 103; and the baseline distance between imaging assembly 101, and low-power illumination assembly 104; and/or the baseline distance between imaging assembly 101, and high-power illumination assembly 112). Hence movement over a given time interval can be determined.

In previous examples, movement, distance/position change of an object in a scene may initiate a protocol wherein the low-power emitter 105 ceases to illuminate the scene and the high-power emitter 113 is activated. Upon activation of the high-power emitter 113 distance data of the object or objects in a scene can be determined (as described above).

Still further, the imaging assembly 101 and/or the low-power illumination assembly 104 and/or the high-power illumination assembly 112 may include other optical filters, passives, other electrical components, and processors and other components (not shown) pertinent to the function of the optoelectronic module 100.

Figure 2A:
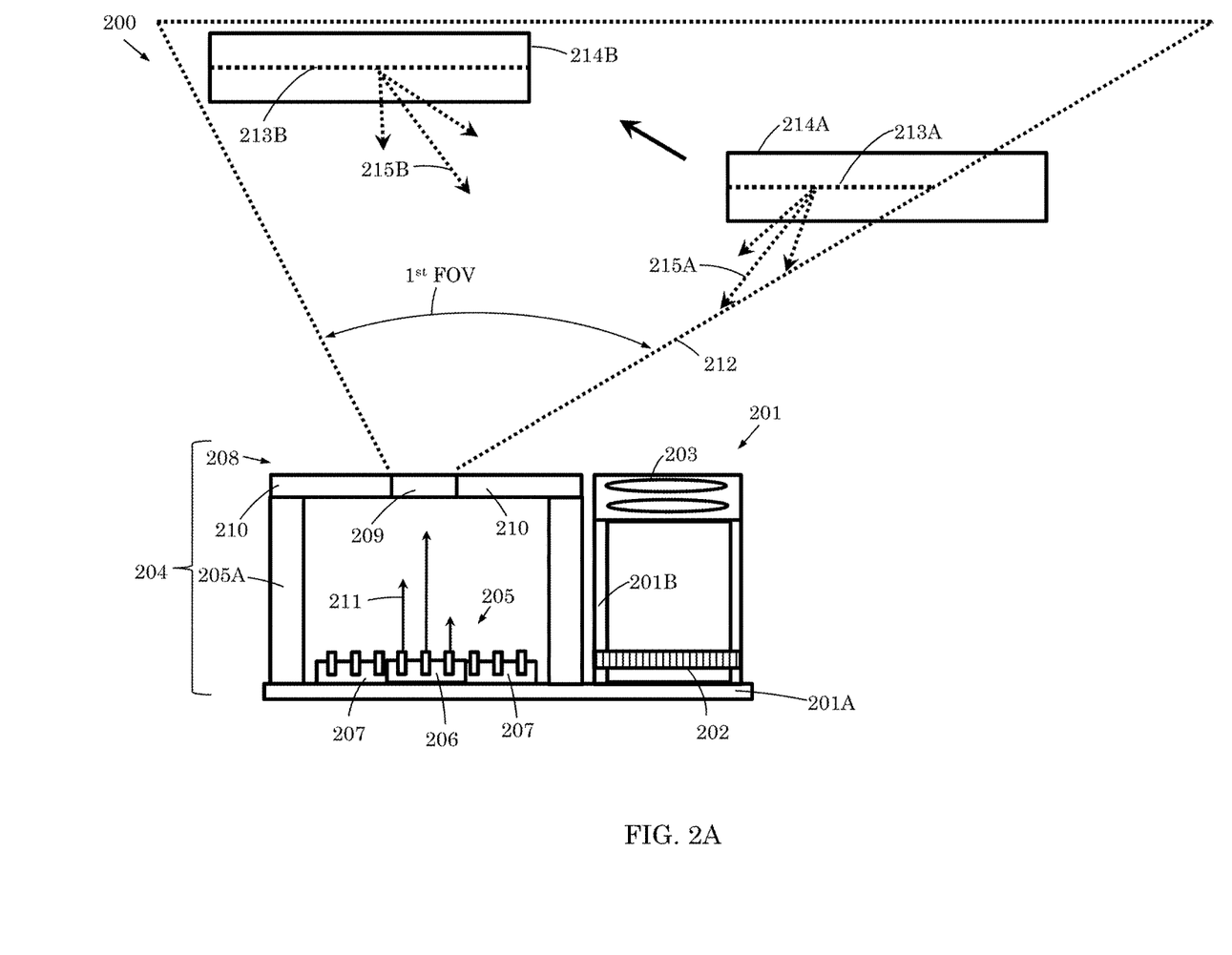
FIG. 2A depicts an example of an optoelectronic module having a hybrid low- and high-power emitter operating in low-power mode.

FIG. 2A depicts an example of an optoelectronic module with a hybrid low- and high-power emitter operating in low-power mode. An optoelectronic module 200 includes an imaging assembly 201, a substrate 201A (such as a PCB), an imaging assembly spacer 201B, and a hybrid illumination assembly 204. The hybrid illumination assembly 204 includes a hybrid emitter 205 mounted on a substrate 201A. The hybrid emitter 205 includes a low-power emitter region 206 (which is an example of a first emitter region) and a high-power emitter region 207 (which is an example of a second emitter region). The imaging assembly 201 can be further composed of a pixel array 202, such as an array of demodulation pixels, mounted on a substrate 201A, and an imaging optical assembly 203. The imaging optical assembly 203 may include a plurality of lens elements, barrels, stops, apertures, and filters. The hybrid illumination assembly 204 can further include an emitter spacer 205A and a hybrid optical assembly 208. The hybrid optical assembly 208 includes a low-power optical assembly region 209 (which is an example of a first optical assembly region) and a high-power optical assembly region 210 (which is an example of a second optical assembly region). Further, the imaging assembly 201 may include an optical assembly, optical filters, a demodulation pixel array, passives and other electrical components (not shown) pertinent to the function of the optoelectronic module 200.

In a low-power mode, the low-power emitter region 206 emits a low-power emitted light 211 (which is an example of a first emitted light). The low-power emitted light 211 can be any wavelength or range of wavelengths of electromagnetic radiation e.g. visible or non-visible radiation. For example, low-power emitted light 211 can be near-, mid-, or far-infrared radiation. Further the low-power emitted light 211 can be modulated. The low-power emitted light 211 is incident on the low-power optical assembly region 209. The low-power optical assembly region 209 can be any one of, or combinations of any one of the following optical elements: a diffraction grating, a microlens array, a lens, a prism, a micro-prism array, a diffractive optical element or a plurality of anyone of the aforementioned or their respective combinations. The low-power optical assembly region 209 may further be composed of apertures, spacers, alignment features, and other components pertinent to its function. The low-power emitted light 211 incident on the low-power optical assembly region 209 produces a low-power emission 212 (which is an example of a first emission), wherein the low-power emission 212 can be in focus and produce a first low-power illumination 213A (which is an example of a first illumination at a first position) on an object at a first position 214A within a particular range of distances (for example, between a few centimeters and several or even tens of meters). The low-power emission 212 may further produce a second low-power illumination 213B (which is an example of a first illumination at a second position) on the object at a second position 214B in the scene. The solid arrow in FIG. 2A illustrates movement of the object from the first position 214A to the second position 214B in the scene. The low-power emission 212 may encompass a first field-of-view (FOV). The first low-power illumination 213A and second low-power illumination 213B may take the form of a pattern of high-contrast features, for example, a discrete array of illuminated dots, lines, or other shapes, or combinations of the aforementioned. The distance between the high-contrast features can be strongly correlated with the intended application of the optoelectronic module 200; generally, the distance between the features can be on the order of the dimension of the objects in the scene or smaller. In general, the power required to produce the low-power emission 212, and subsequent low-power illuminations 213A and 213B, is considerably less than the power required to produce a homogenous illumination of the same intensity.

A first low-power reflected light 215A (which is an example of a first reflected light at a first position) can be reflected from the object at a first position 214A and the second low-power reflected light 215B (which is an example of a first reflected light at a first position) can be reflected from the object at a second position 214B. The reflected light can be collected and processed by the imaging assembly 201. For example, the first low-power reflected light 215A can be imaged by an optical assembly 203 and focused onto a demodulation pixel array 202, wherein a distant-dependent phase-shift can be determined and correlated with distance from the optoelectronic module 200 to the object at a first position 214A. Similarly, at another instant in time for example, the second low-power reflected light 215B can be correlated with distance to the object at a second position 214B as described above. The detection of a distance or position change between the object at a first position 214A and the object at a second position 214B is associated with object movement. Generally, the aforementioned detection of movement of the object from the first position to the second position may activate a high-power mode, e.g. may activate the high-power emitter region 207. However, in other instances, an object entering the scene may also activate a high-power mode.

Figure 2B:
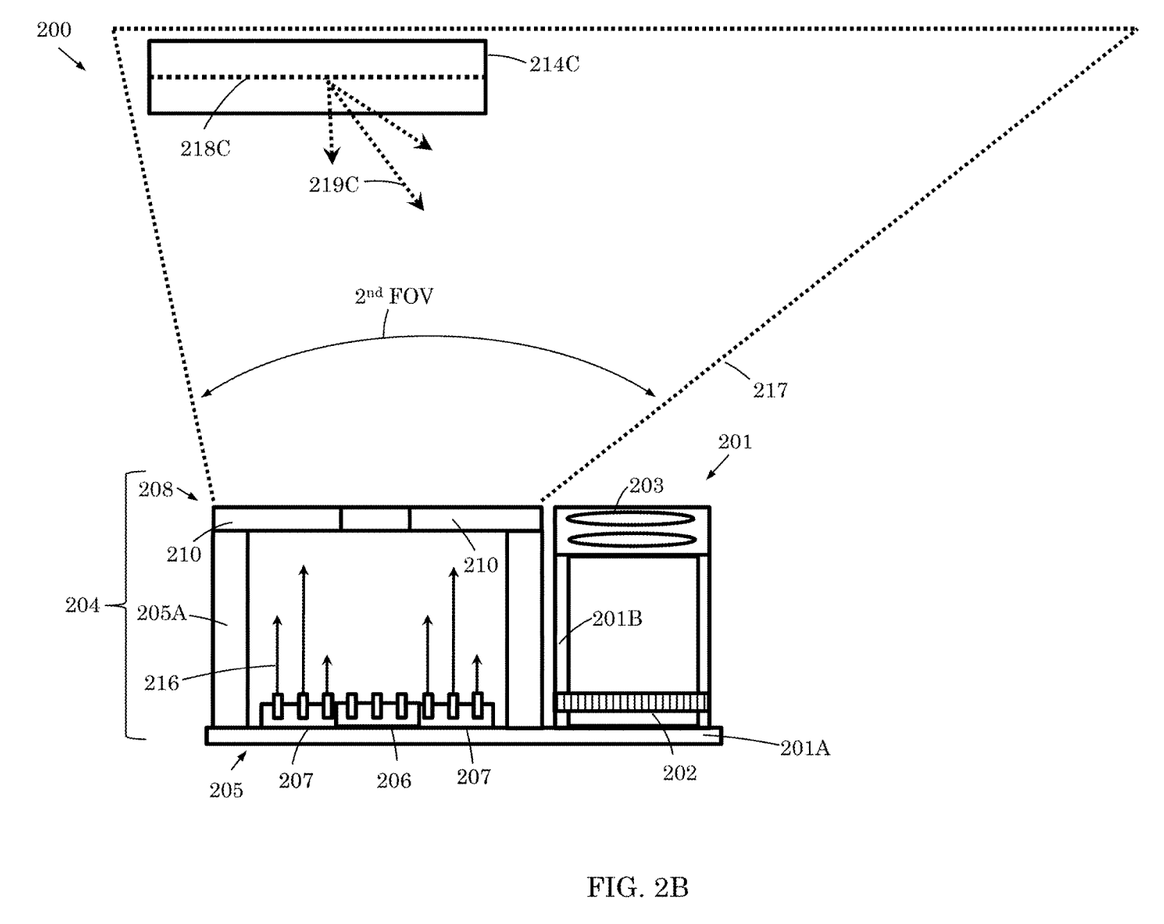
FIG. 2B depicts an example of an optoelectronic module having a hybrid low- and high-power emitter operating in high-power mode.

FIG. 2B depicts an example of an optoelectronic module with a hybrid low- and high-power emitter operating in high-power mode. In a high-power mode, the high-power emitter region 207 emits a high-power emitted light 216 (which is an example of a second emitted light). The high-power emitted light 216 can be any wavelength or range of wavelengths of electromagnetic radiation (e.g. visible or non-visible radiation). For example, high-power emitted light 216 can be near-, mid-, or far-infrared radiation. Further the high-power emitted light 216 can be modulated. The high-power emitted light 216 is incident on the high-power optical assembly region 210. The high-power optical assembly region 210 can be any one of, or combinations of, the following optical elements: a diffraction grating, a microlens array, a lens, a prism, a micro-prism array, a diffractive optical element or a plurality of any one of the aforementioned or their respective combinations. The high-power optical assembly region 210 may further be composed of apertures, spacers, alignment features, and other components pertinent to its function. The high-power emitted light 216 incident on the high-power optical assembly region 210 produces a high-power emission 217 (which is an example of a second emission), wherein the high-power emission 217 can be in focus and produce a high-power illumination 218C (which is an example of a second illumination) on an object or objects 214C in a scene within a particular range of distances (for example, between a few centimeters and several or even tens of meters). The high-power emission 217 may encompass a second FOV. Further the second FOV may substantially encompass, and can be substantially equivalent to, the first FOV. Both the first and second FOV can be, for example, from about 20° to 140°, although they may be greater depending on the intended application.

The high-power illumination 218C can be a homogenous (non-patterned, non-discrete) illumination. In other cases the high-power illumination 218C may take the form of a dense pattern of high-contrast features, for example, a discrete array of illuminated dots, lines, or other shapes, or combinations of the aforementioned features. A high-power reflected light 219C (which is an example of a second reflected light) can be reflected from an object or objects 214C, and collected and processed by the imaging assembly 201. For example, the high-power reflected light 219C can be focused by the imaging optical assembly 203 onto the pixel array 202, wherein a distant-dependent phase-shift can be determined and correlated with distance to an object or objects 214C in the scene. The high-power reflected light 219C, resulting from the high-power illumination 218C, can be focused on a large fraction of the demodulation pixels in the pixel array, whereas the first and second low-power reflected light 215A, 215B resulting from the first low-power illumination 213A and second low-power illumination 213B are only focused on a fraction of demodulation pixels in the demodulation pixel array 202. Consequently, higher resolution data can be obtained when high-power emitted light 216 is employed.

The optoelectronic module 200 described above may exhibit considerable reduction in power consumption. For example, the low-power emitter region 206 of the hybrid illumination assembly 204 may illuminate an object or objects in a scene until an objected movement is detected, then high-power emitted light can be employed to obtain higher resolution distance data of the object/scene of interest.

Still further, the optoelectronic module 200 described above may exhibit even greater reduction in power consumption when either the low-power emitter region 206 and/or the high-power emitter region 207 are operated in a pulsed mode. For example, the low-power emitter region 206 (which is an example of a first emitter region) may illuminate an object or objects in a scene for a short period (e.g., a fraction of a second to 1 second) and my cease to illuminate an object or objects in a scene for another short period (e.g., 1 second to a few seconds). This regime may continue until an object in the scene moves. Upon the detection of movement, as outlined above, the high-power mode (as disclosed previously) can be activated; that is the high-power emitter region 207 can be activated. In other cases, the high-power emitter region 207 of the hybrid illumination assembly 204 can be operated in a similar manner. However, the high-power emitter region 207 may illuminate and cease to illuminate the scene at considerably shorter periods (e.g. fractions of a second). The duration of the periods of illumination can be highly dependent on the nature of the objects (e.g., their speed of movement, position change).

Although in the above examples object movement was detected by a phase shift in the modulated light reflected by an object in a scene, other variations to the optoelectronic module can be used to detect object movement. For example, the low-power emitter region 206 need not illuminate objects in a scene with modulated light. Objects can be illuminated with un-modulated light, wherein the intensity of light reflected from objects in a scene may change and be correlated with movement. Still further other approaches can be used to detect movement such as via triangulation, i.e., where reflected light focused on a pixel array can be used to determine distance to an object (e.g., using the focal length of the imaging optical assembly 203, and the baseline distance between imaging assembly 201 and low-power illumination assembly 204). Hence movement over a given time interval can be determined.

In previous examples, movement, distance/position change of an object in a scene may initiate a protocol wherein the low-power emitter region 206 ceases to illuminate the scene and the high-power emitter region 207 is activated. Upon activation of the high-power emitter region 207 distance data of the object or objects in a scene can be determined (as disclosed above).

Still further, the imaging assembly 201 and/or the hybrid illumination assembly 204 may further include other optical filters, passives, other electrical components, and processors and other components (not shown) pertinent to the function of the optoelectronic module 100.

Figure 3A:
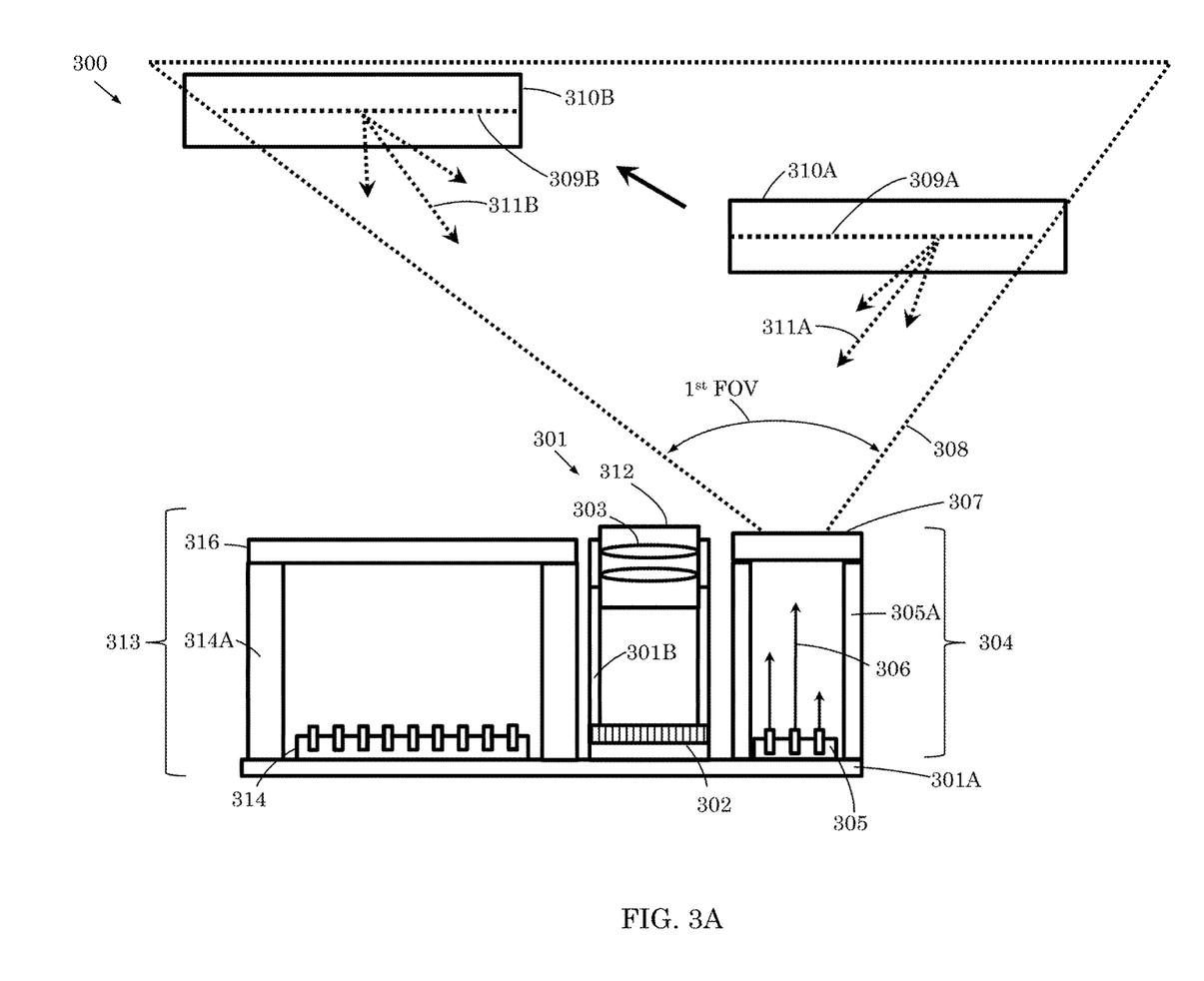
FIG. 3A depicts an example of an optoelectronic module including an autofocus assembly and having low- and high-power emitters operating in a low-power mode.

FIG. 3A depicts an example of an optoelectronic module 300 including an autofocus assembly and with low- and high-power emitters operating in a low-power mode. The optoelectronic module 300 can include an imaging assembly 301, a substrate 301A (such as a PCB), a low-power illumination assembly 304 (which is an example of a first illumination assembly), a high-power illumination assembly 313 (which is an example of a second illumination assembly), and an autofocus assembly 312. The imaging assembly 301 can be further composed of an imaging assembly spacer 301B, a pixel array 302, such as an array of demodulation pixels, mounted on a substrate 301A, and an imaging optical assembly 303. The imaging optical assembly 303 may include a plurality of lens elements, barrels, stops, apertures, and filters. The low-power illumination assembly 304 can be further composed of a low-power emitter 305 (which is an example of a first emitter) such as a light emitting diode, laser, vertical-cavity surface-emitting laser (VCSEL), or VCSEL array, mounted on a substrate 301A; a first emitter spacer 305A; and a low-power optical assembly 307 (which is an example of a first optical assembly). In a low-power mode, the low-power emitter 305 emits a low-power emitted light 306 (which is an example of a first emitted light). The low-power emitted light 306 can be any wavelength or range of wavelengths of electromagnetic radiation e.g. visible or non-visible radiation. For example, low-power emitted light 306 can be near-, mid-, or far-infrared radiation. Further the low-power emitted light 306 can be modulated. The low-power emitted light 306 is incident on the low-power optical assembly 307. The low-power optical assembly 307 can be any one of, or combinations of any one of the following optical elements: a diffraction grating, a microlens array, a lens, a prism, a micro-prism array, a diffractive optical element or a plurality of anyone of the aforementioned or their respective combinations. The low-power optical assembly 307 may further be composed of apertures, spacers, alignment features, and other components pertinent to its function. The low-power emitted light 306 incident on the low-power optical assembly 307 may produce a low-power emission 308 (which is an example of a first emission).

The low-power emission 308 may produce a first low-power illumination 309A (which is an example of a first illumination at a first position) incident on an object at a first position 310A in a scene. The object can be illuminated by the first low-power illumination 309A when at a particular distance or range of distances (e.g., between a few centimeters and several or even tens of meters). The low-power emission 308 may further produce a second low-power illumination 309B (which is an example of a first illumination at a second position) on the object at a second position 310B in the scene. The solid arrow in FIG. 3A illustrates movement of the object from the first position 310A to the second position 310B in the scene. The low-power emission 308 may encompass a first field-of-view (FOV). The first low-power illumination 309A and second low-power illumination 309B may take the form of a pattern of high-contrast features, for example, a discrete array of illuminated dots, lines, or other shapes, or combinations of the aforementioned. The distance between the high-contrast features can be strongly correlated with the intended application of the optoelectronic module 300; generally, the distance between the features can be on the order of the dimension of the objects in the scene or smaller. In general, the power required to produce the low-power emission 308, and subsequent low-power illuminations 309A and 309B, is considerably less than the power required to produce a homogenous illumination of the same intensity.

A first low-power reflected light 311A (which is an example of a first reflected light at a first position) can be reflected from the object at a first position 310A and the second low-power reflected light 311B (which is an example of a first reflected light at a second position) can be reflected from the object at a second position 310B. The reflected light can be collected and processed by the imaging assembly 301. For example, the first low-power reflected light 311A can be imaged by an optical assembly 303 and focused onto a demodulation pixel array 302, wherein a distant-dependent phase-shift can be determined and correlated with distance from the optoelectronic module 300 to the object at a first position 310A. Similarly, at another instant in time for example, the second low-power reflected light 311B can be correlated with distance to the object at a second position 310B as described above. The detection of a distance or position change between the object at a first position 310A and the object at a second position 310B is associated with object movement. Generally, the aforementioned detection of movement of the object from the first position to the second position may activate a high-power mode, e.g., may activate the high-power illumination assembly 313. However, in other instances, an object entering the scene may also activate a high-power mode.

The autofocus assembly 312 can be composed of actuating means, e.g., piezoelectric actuators or voice-coil actuators, and/or variable focus lenses, or indeed other known means for adjusting the focus of an imaging optical assembly such as the imaging optical assembly 303. The autofocus assembly 312 can be engaged to adjust the focus of imaging optical assembly 303 according to the following manner. The low-power emission 308 may produce the first low-power illumination 309A on the object at a first position 310A. The first low-power reflected light 311A can be focused onto the pixel array 302 via the imaging optical assembly 303. Distance between the optoelectronic module 300 and the object at a first position 310A can be determined via any of the previous disclosed techniques wherein the autofocus assembly 312 can be appropriately adjusted such that the object at a first position 310A is in focus with respect to the imaging assembly 301 or indeed another imaging assembly (not shown).

Figure 3B:
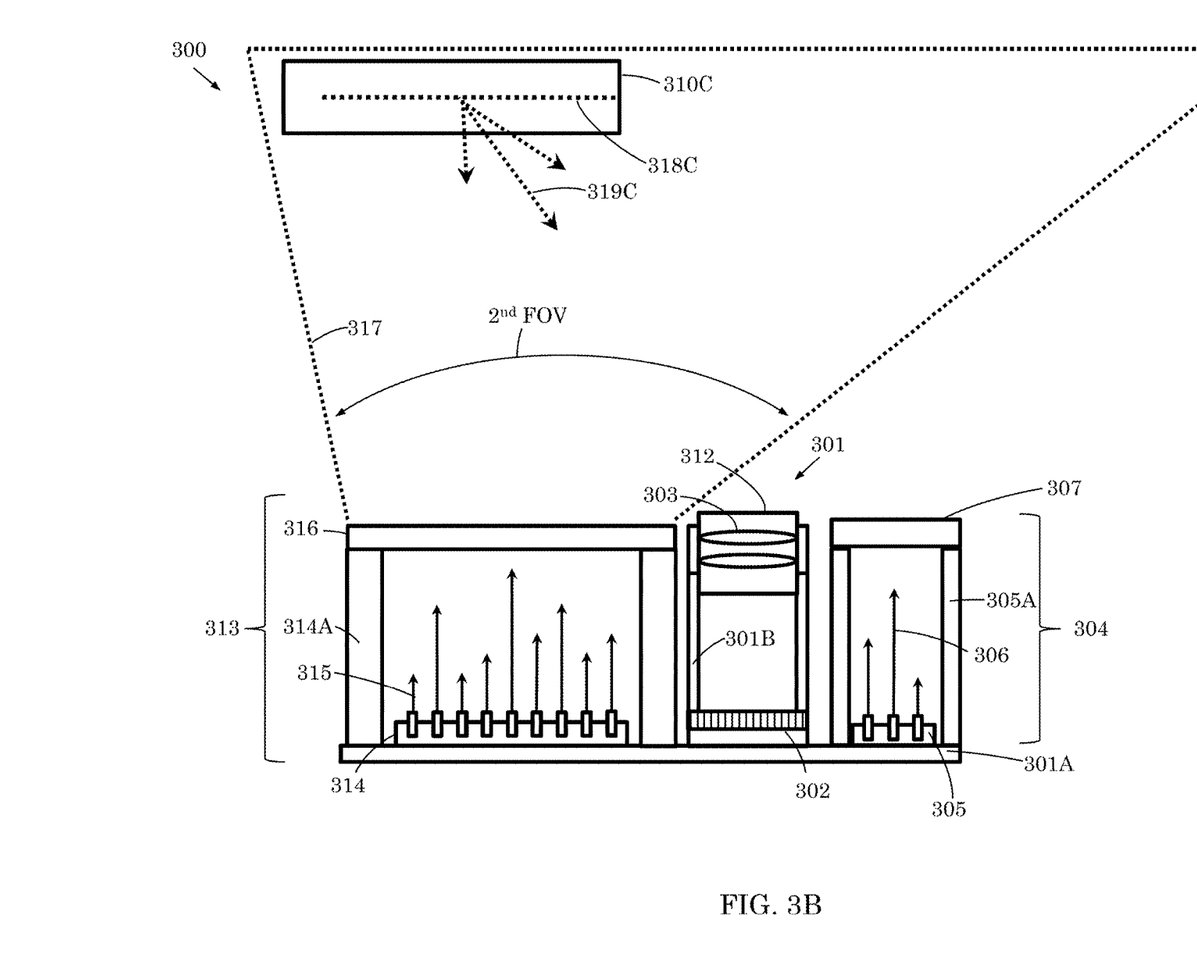
FIG. 3B depicts an example of an optoelectronic module including an autofocus assembly and having low- and high-power emitters and an autofocus assembly operating in a high-power mode.

FIG. 3B depicts an example of an optoelectronic module having low- and high-power emitters operating in a high-power mode. The high-power illumination assembly 313 is composed of a high-power emitter 314 (which is an example of a second emitter) mounted on a substrate 301A, a second emitter spacer 314A, and a high-power optical assembly 316 (which is an example of a second optical assembly). In a high-power mode, the high-power emitter 314 emits a high-power emitted light 315. The high-power emitted light 315 (which is an example of a second emitted light) can be any wavelength or range of wavelengths of electromagnetic radiation e.g. visible or non-visible radiation. For example, the high-power emitted light 315 can be near-, mid-, or far-infrared radiation. Further the high-power emitted light 315 can be modulated.

Still further, the high-power emitted light 315 is incident on the high-power optical assembly 316. The high-power optical assembly 316 can be any one of, or combinations of any one of the following optical elements: a diffraction grating, a microlens array, a lens, a prism, a micro-prism array, a diffractive optical element or a plurality of anyone of the aforementioned or their respective combinations. The high-power optical assembly 316 may further be composed of apertures, spacers, alignment features, and other components pertinent to its function. The high-power emitted light 315 incident on the high-power optical assembly 316 produces a high-power emission 317 (which is an example of a second emission), wherein the high-power emission 317 can be in focus and produce a high-power illumination 318C (which is an example of a second illumination) on an object or objects 310C in a scene within a particular range of distances (for example, between a few centimeters and several or even tens of meters). The high-power emission 317 may encompass a second FOV. Further the second FOV may substantially encompass, and can be substantially equivalent to, the first FOV. Both the first and second FOV can be, for example, from about 20° to 140°, and in some cases may be greater depending on the intended application.

The high-power illumination 318C can be a homogenous (non-patterned, non-discrete) illumination. In other cases the high-power illumination 318C may take the form of a dense pattern of high-contrast features, for example, a discrete array of illuminated dots, lines, or other shapes, or combinations of the aforementioned. A high-power reflected light 319C (which is an example of a second reflected light) can be reflected from an object or objects 310C, and collected and processed by the imaging assembly 301. For example, the high-power reflected light 319C can be focused by the imaging optical assembly 303 onto the pixel array 302, wherein a distant-dependent phase-shift can be determined and correlated with distance to an object or objects 310C in the scene. The high-power reflected light 319C, resulting from the high-power illumination 318C, can be focused on a large fraction of the demodulation pixels in the pixel array, whereas the first and second low-power reflected light 311A, 311B, resulting from the first low-power illumination 309A and second low-power illumination 309B, respectively, are only focused on a fraction of demodulation pixels in the demodulation pixel array 302. Consequently, higher resolution data can be obtained when the high-power illumination assembly 313 is employed.

The optoelectronic module 300 described above may exhibit considerable reduction in power consumption. For example, the low-power illumination assembly 304 of the optoelectronic module 300 may illuminate an object or objects in a scene until an objected movement is detected, then the high-power illumination assembly 313 can be employed to obtain higher resolution distance data of the object/scene of interest.

Still further, the optoelectronic module 300 described above may exhibit even greater reduction in power consumption when either the low-power emitter 305 and/or the high-power emitter 313 are operated in a pulsed mode. For example, the low-power emitter 305 may illuminate an object or objects in a scene for a short period (e.g., a fraction of a second to 1 second) and my cease to illuminate an object or objects in a scene for another short period (e.g., 1 second to a few seconds). This regime may continue until an object in the scene moves. Upon the detection of movement, as outlined above, the high-power mode (as disclosed previously) can be activated. In other cases, the high-power emitter 313 can be operated in a similar manner. However, the high-power emitter 313 may illuminate and cease to illuminate the scene at considerably shorter periods (e.g., fractions of a second). The duration of the periods of illumination can be highly dependent on the nature of the objects (e.g., their speed of movement, position change).

Although in the above examples object movement was detected by a phase shift in the modulated light reflected by an object in a scene, other variations to the optoelectronic module can be used to detect object movement. For example, the low-power illumination assembly 304 need not illuminate objects in a scene with modulated light. Objects can be illuminated with un-modulated light, wherein the intensity of light reflected from objects in a scene may change and be correlated with movement. Still further, other approaches can be used to detect movement such as via triangulation, i.e. where reflected light focused on a pixel array can be used to determine distance to an object (e.g., using the focal length of the imaging optical assembly 303; and the baseline distance between imaging assembly 301, and low-power illumination assembly 304; and/or the baseline distance between imaging assembly 301, and high-power illumination assembly 313). Hence movement over a given time interval can be determined.

In previous examples, movement, distance/position change of an object in a scene may initiate a protocol wherein the low-power emitter 305 ceases to illuminate the scene and the high-power emitter 314 is activated. Upon activation of the high-power emitter 314 distance data of the object or objects in a scene can be determined (as described above).

Still further, the imaging assembly 301 and/or the low-power illumination assembly 304 and/or the high-power illumination assembly 313 may include other optical filters, passives, other electrical components, and processors and other components (not shown) pertinent to the function of the optoelectronic module 300.

Figure 4A:
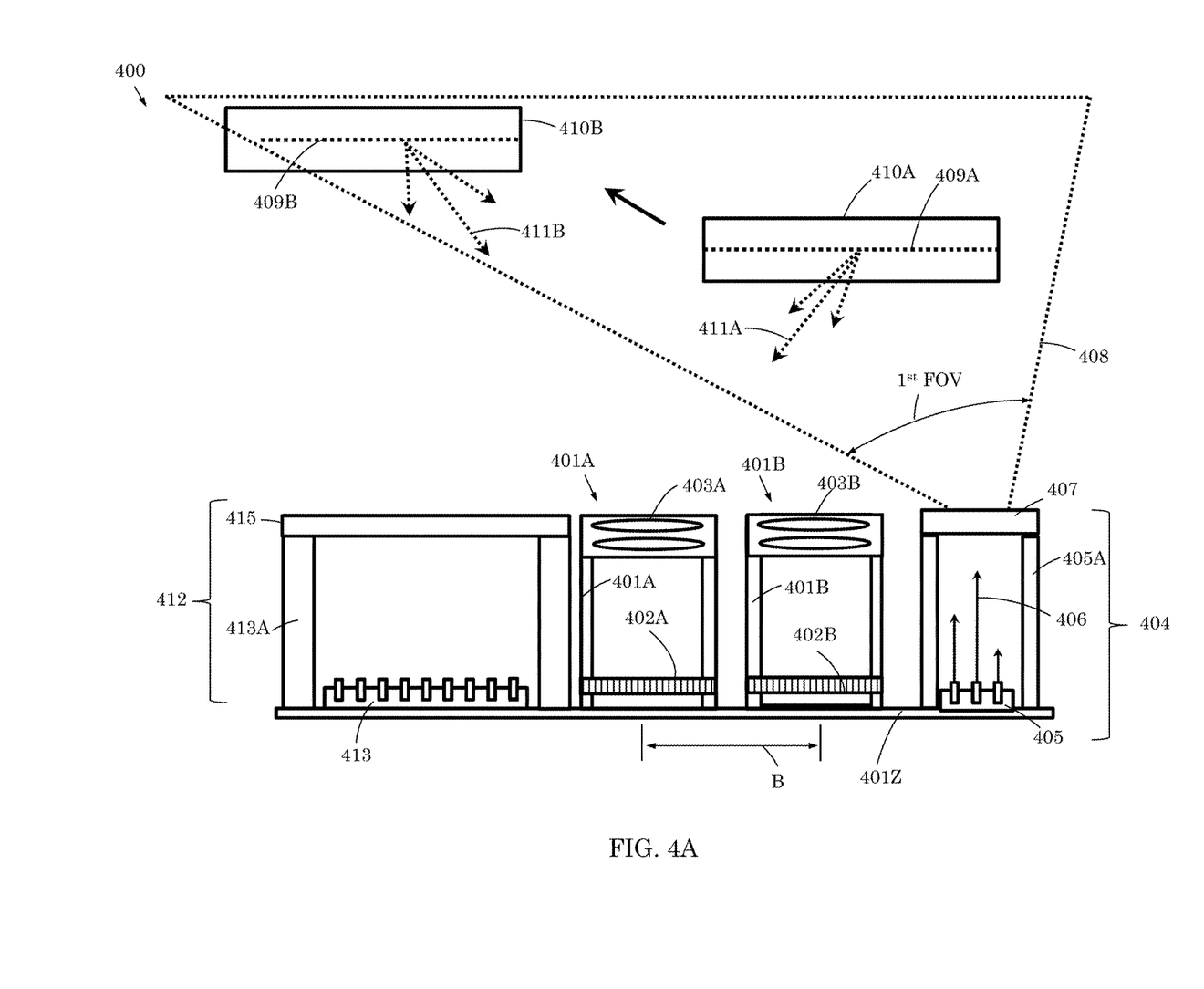
FIG. 4A depicts an example of an optoelectronic module configured to capture stereo images and having low- and high-power emitters operating in a low-power mode.

FIG. 4A depicts an example of an optoelectronic module 400 configured to capture stereo images and with low- and high-power emitters operating in a low-power mode. The optoelectronic module 400 includes a substrate 401Z (such as a PCB), a first imaging assembly 401A and a second imaging assembly 401B wherein each first imaging assembly 401A and second imaging assembly 401B are composed of a first and second pixel array 402A, 402B mounted on a substrate 401Z, a first and second imaging assembly spacer 401X, 401Y, and a first and second imaging optical assembly 403A, 403B. The first and second imaging assemblies are separated by a baseline B. In this example, movement of an object can be detected in a low-power mode as described in reference to FIG. 1A-FIG. 3B above. Movement of an object can be detected by using the first and/or second imaging optical assemblies 403A, 403B. The optoelectronic module 400 can be further composed of a low-power illumination assembly 404 (which is an example of a first illumination assembly) and a high-power illumination assembly 412 (which is an example of a second illumination assembly). The imaging assemblies 401A, 401B can be further composed of pixel arrays 402A, 402B such as an array of demodulation pixels, and an imaging optical assemblies 403A, 403B. The imaging optical assemblies 403A, 403B may include a plurality of lens elements, barrels, stops, apertures, and filters. The low-power illumination assembly 404 can be further composed of a low-power emitter 405 (which is an example of a first emitter) such as a light emitting diode, laser, vertical-cavity surface-emitting laser (VCSEL), or VCSEL array; a first emitter spacer 405A, mounted on a substrate 401Z; and a low-power optical assembly 407 (which is an example of a first optical assembly). In a low-power mode, the low-power emitter 405 emits a low-power emitted light 406 (which is an example of a first emitted light). The low-power emitted light 406 can be any wavelength or range of wavelengths of electromagnetic radiation (e.g. visible or non-visible radiation). For example, low-power emitted light 406 can be near-, mid-, or far-infrared radiation. Further the low-power emitted light 406 can be modulated. The low-power emitted light 406 is incident on the low-power optical assembly 407. The low-power optical assembly 407 can be any one of, or combinations of, the following optical elements: a diffraction grating, a microlens array, a lens, a prism, a micro-prism array, a diffractive optical element or a plurality of any one of the aforementioned or their respective combinations. The low-power optical assembly 407 may further be composed of apertures, spacers, alignment features, and other components pertinent to its function. The low-power emitted light 406 incident on the low-power optical assembly 407 may produce a low-power emission 408 (which is an example of a first emission).

The low-power emission 408 may produce a first low-power illumination 409A (which is an example of a first illumination at a first position) incident on an object at a first position 410A in a scene. The object can be illuminated by the first low-power illumination 409A when at a particular distance or range of distances (e.g., between a few centimeters and several or even tens of meters). The low-power emission 408 may further produce a second low-power illumination 409B (which is an example of a first illumination at a second position) on the object at a second position 410B in the scene. The solid arrow in FIG. 4A illustrates movement of the object from the first position 410A to the second position 410B in the scene. The low-power emission 408 may encompass a first field-of-view (FOV). The first low-power illumination 409A and second low-power illumination 409B may take the form of a pattern of high-contrast features, for example, a discrete array of illuminated dots, lines, or other shapes, or combinations of the aforementioned. The distance between the high-contrast features can be strongly correlated with the intended application of the optoelectronic module 400; generally, the distance between the features can be on the order of the dimension of the objects in the scene or smaller. In general, the power required to produce the low-power emission 408, and subsequent low-power illuminations 409A and 409B, is considerably less than the power required to produce a homogenous illumination of the same intensity.

A first low-power reflected light 411A (which is an example of a first reflected light at a first position) can be reflected from the object at a first position 410A and the second low-power reflected light 411B (which is an example of a first reflected light at a second position) can be reflected from the object at a second position 410B. The reflected light can be collected and processed by both the imaging assemblies 401A, 401B. For example, the first low-power reflected light 411A can be imaged by the optical assemblies 403A, 403B and focused onto a demodulation pixel arrays 402A, 402B, wherein a disparity can be determined (e.g., via standard stereo matching algorithms) and correlated with distance from the optoelectronic module 400 to the object at a first position 410A. Similarly, at another instant in time for example, the second low-power reflected light 411B can be correlated with distance to the object at a second position 410B as described above. The detection of a distance or position change between the object at a first position 410A and the object at a second position 410B is associated with object movement. Generally, the aforementioned detection of movement of the object from the first position to the second position may activate a high-power mode, e.g. may activate the high-power illumination assembly 412. However, in other instances, an object entering the scene may also activate a high-power mode.

Figure 4B:
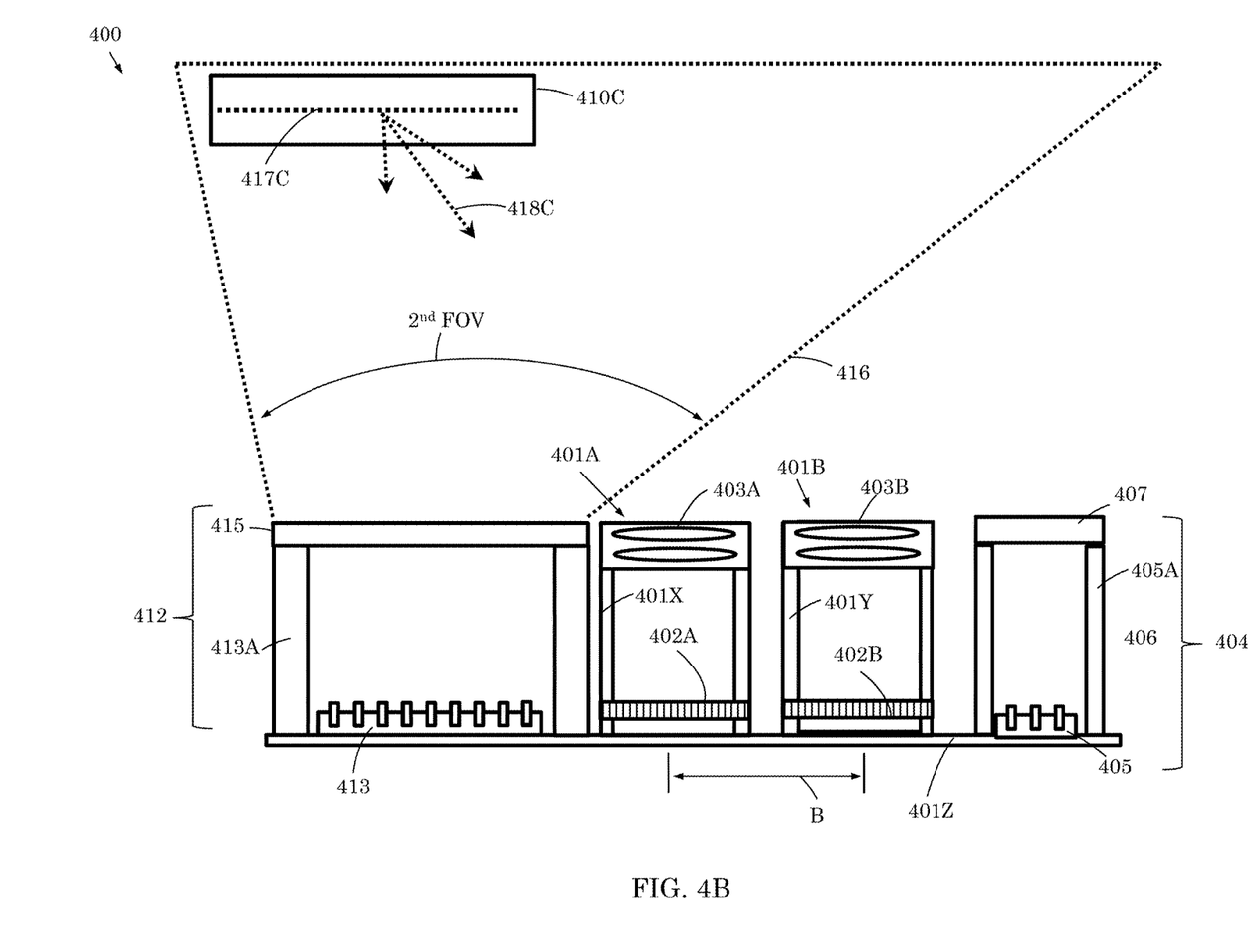
FIG. 4B depicts an example of an optoelectronic module configured to capture stereo images and having low- and high-power emitters operating in a high-power mode.

FIG. 4B depicts an example of an optoelectronic module with low- and high-power emitters operating in a high-power mode. The high-power illumination assembly 412 is composed of a high-power emitter 413 (which is an example of a second emitter) mounted on a substrate 401Z, a second emitter spacer 413A, and a high-power optical assembly 415 (which is an example of a second optical assembly). In a high-power mode, the high-power emitter 413 emits a high-power emitted light 414 (which is an example of a second emitted light). The high-power emitted light 414 can be any wavelength or range of wavelengths of electromagnetic radiation e.g. visible or non-visible radiation. For example, the high-power emitted light 414 can be near-, mid-, or far-infrared radiation. Further the high-power emitted light 414 can be modulated.

Still further, the high-power emitted light 414 is incident on the high-power optical assembly 415. The high-power optical assembly 415 can be any one of, or combinations of, the following optical elements: a diffraction grating, a microlens array, a lens, a prism, a micro-prism array, a diffractive optical element or a plurality of anyone of the aforementioned or their respective combinations. The high-power optical assembly 415 may further be composed of apertures, spacers, alignment features, and other components pertinent to its function. The high-power emitted light 414 incident on the high-power optical assembly 415 produces a high-power emission 416 (which is an example of a second emission), wherein the high-power emission 416 can be in focus and produce a high-power illumination 417C (which is an example of a second illumination) on an object or objects 410C in a scene within a particular range of distances (for example, between a few centimeters and several or even tens of meters). The high-power emission 416 may encompass a second FOV. Further the second FOV may substantially encompass, and can be substantially equivalent, to the first FOV. Both the first and second FOV can be, for example, from about 20° to 140°, and in some instances may be greater depending on the intended application.

The high-power illumination 417C can be a homogenous (non-patterned, non-discrete) illumination. In other cases the high-power illumination 417C may take the form of a dense pattern of high-contrast features, for example, a discrete array of illuminated dots, lines, or other shapes, or combinations of the aforementioned. A high-power reflected light 418C (which is an example of a second reflected light) can be reflected from an object or objects 410C, and collected and processed by the imaging assemblies 401A, 401B. For example, the high-power reflected light 418C can be focused by the imaging optical assemblies 403A, 403B onto the pixel arrays 402A, 402B wherein a disparity can be determined (e.g., via standard stereo matching algorithms) and correlated with distance from the optoelectronic module 400 to the object. The high-power reflected light 418C, resulting from the high-power illumination 417C, can be focused on a large fraction of the demodulation pixels in the pixel arrays 402A, 402B, whereas the first and second low-power reflected light 411A, 411B, resulting from the first low-power illumination 409A and second low-power illumination 409B, respectively, are only focused on a fraction of demodulation pixels in the demodulation pixel arrays 402A, 402B. Consequently, higher resolution data can be obtained when the high-power illumination assembly 412 is employed.

In previous examples, movement, distance/position change of an object in a scene may initiate a protocol wherein the low-power emitter 405 ceases to illuminate the scene and the high-power emitter 413 is activated. Upon activation of the high-power emitter 413 distance data of the object or objects in a scene can be determined (as described above).

Still further, the imaging assembly 401 and/or the low-power illumination assembly 404 and/or the high-power illumination assembly 412 may further include other optical filters, passives, other electrical components, and processors and other components (not shown) pertinent to the function of the optoelectronic module 400.

Further, in any of the examples described above, the low-power mode can be sufficient for near-range image capture (where the distance between the pattern features can be very small—so sufficient illumination is supplied to near object using the low-power mode). In such an example, the high-power mode is used for far objects.

The various implementation of the optoelectronic modules described in the above examples may further include, processors, other electrical components or circuit elements (e.g., transistors, resistors, capacitive and inductive elements) pertinent to the function of the optoelectronic modules and apparent to a person of ordinary skill in the art. Moreover, although the present invention has been described in detail with respect to various implementations described above, other implementations including combinations or subtractions of various described features above, are also possible. Thus, other implementations are within the scope of the claims.

What is claimed is:

1. An optoelectronic module comprising:
   a substrate on which are integrated an imaging assembly, a first illumination assembly, and a second illumination assembly;
   the imaging assembly including a pixel array operable to detect one or more wavelengths of light, an imaging assembly spacer, and an imaging optical assembly, wherein the pixel array is mounted to the substrate, and the imaging assembly spacer is disposed in between the imaging optical assembly and the substrate, and the optical assembly is aligned with the pixel array;
   the first illumination assembly including a first emitter operable to emit a first emitted light of one or more wavelengths, a first emitter spacer, and a first optical assembly operable to allow a first emission of the first emitted light to pass, wherein the first emitter is mounted to the substrate, and the first emitter spacer is disposed in between the first optical assembly and the substrate, and the first optical assembly is aligned with the first emitter;
   the second illumination assembly including a second emitter operable to emit a second emitted light of one or more wavelengths, a second emitter spacer, and a second optical assembly operable to allow a second emission of the second emitted light to pass, wherein the second emitter is mounted to the substrate, and the second emitter spacer is disposed in between the second optical assembly and the substrate, and the second optical assembly is aligned with the second emitter;
   the first illumination assembly and the second illumination assembly arranged, respectively, to generate first and second respective illuminations with different powers from one another,
   wherein the optoelectronic module is operable such that the first emission results in a first illumination on an object in a scene at a first position and a first illumination on the object in a scene at a second position, the first illumination on the object in a scene at a first position generating a first reflected light from the object in a scene at a first position and the first illumination on the object in a scene at a second position generating a first reflected light from an object in a scene at a second position, and the second emission resulting in a second illumination on the object in a scene, the second illumination generating a second reflected light from the object in the scene.

2. The optoelectronic module of claim 1 wherein the module is operable to determine a distance to an object based on reflections of light from the object detected by the pixel array of the imaging assembly, wherein a change in position of the object detected by the module activates emission of light by the second emitter.

3. The optoelectronic module of claim 1 operable such that a change in position of the object detected by the module causes the first emitter to cease illumination.

4. The optoelectronic module of claim 1 operable such that the first reflected light from the object in the scene at a first position is collected by the imaging assembly, and the distance between the optoelectronic module and the object at the first position is determined.

5. The optoelectronic module of claim 4 operable such that the first reflected light from the object in the scene at a second position is collected by the imaging assembly, and the distance between the optoelectronic module and the object at the second position is determined.

6. The optoelectronic module of claim 5 operable such that a difference in the determined distance of the object in the scene at the first position and the determined distance of the object in the scene at the second position initiates emission of the second emitted light of the second illumination assembly.

7. The optoelectronic module of claim 1 operable such that the second reflected light from the object in the scene is collected by the imaging assembly, and the distance between the optoelectronic module and the object is determined.

8. The optoelectronic module of claim 1 operable such that the second emitter is operable to emit light at a higher power than the first emitter.

9. The optoelectronic module of claim 1 operable such that, when activated, at least one of the first emitter or the second emitter operates in a pulsed mode.

10. The optoelectronic module of claim 1 operable such that the second emitter has a field of view that encompasses a field of view of the first emitter.

11. An optoelectronic module comprising:
a substrate on which are integrated an imaging assembly and a hybrid illumination assembly;
the imaging assembly including a pixel array operable to detect one or more wavelengths of light, an imaging assembly spacer, and an imaging optical assembly, wherein the pixel array is mounted to the substrate, and the imaging assembly spacer is disposed in between the imaging optical assembly and the substrate, and the optical assembly is aligned with the pixel array; and
the hybrid illumination assembly arranged to generate first and second respective illuminations with different powers from one another and including a hybrid emitter, the hybrid emitter including a first emitter region operable to emit a first emitted light of one or more wavelengths, and a second emitter region operable to emit a second emitted light of one or more wavelengths, an emitter spacer, and a hybrid optical assembly including a first optical assembly region operable to allow a first emission of the first emitted light to pass, and a second optical assembly region operable to allow a second emission of the second emitted light to pass, wherein the first emitter region and the second emitter region are mounted to the substrate, and the emitter spacer is disposed in between the hybrid optical assembly and the substrate, and the first optical assembly region is aligned with the first emitter region, and the second optical assembly region is aligned with the second emitter,
wherein the optoelectronic module is operable such that the first emission results in a first illumination on an object in a scene at a first position and a first illumination on the object in a scene at a second position, the first illumination on the object in a scene at a first position generating a first reflected light from the object in a scene at a first position and the first illumination on the object in a scene at a second position generating a first reflected light from an object in a scene at a second position, and the second emission resulting in a second illumination on the object in a scene, the second illumination generating a second reflected light from the object in the scene.

12. The optoelectronic module of claim 11 wherein the module is operable to determine a distance to an object based on reflections of light from the object detected by the pixel array of the imaging assembly, wherein a change in position of the object detected by the module activates emission of light by the second emitter region, and wherein a change in position of the object detected by the module causes the first emitter region to cease illumination.

13. The optoelectronic module of claim 11, further comprising a second imaging assembly, the second imaging assembly including a second pixel array operable to detect one or more wavelengths of light, a second imaging assembly spacer, and a second imaging optical assembly, wherein the second pixel array is mounted to the substrate and the second imaging assembly spacer is disposed in between the second imaging optical assembly and the substrate, and the second optical assembly is aligned with the second pixel array, wherein the optoelectronic module is operable to determine a distance to an object based on stereo imaging.

14. The optoelectronic module of any one of claim 11, further comprising an autofocus assembly.

15. The optoelectronic module of claim 11 operable such that:
reflected light from the object in the scene at a first position is collected by the imaging assembly, and the distance between the optoelectronic module and the object at the first position is determined,
reflected light from the object in the scene at a second position is collected by the imaging assembly, and the distance between the optoelectronic module and the object at the second position is determined, and
a difference in the determined distance of the object in the scene at the first position and the determined distance of the object in the scene at the second position initiates emission of the second emitted light of the second illumination assembly.

* * * * *